US011759882B1

(12) United States Patent
Nicewonger

(10) Patent No.: US 11,759,882 B1
(45) Date of Patent: Sep. 19, 2023

(54) REPURPOSED ROBOT MOTION FOR PURGING COOLANT FROM RESISTANCE WELDING ELECTRODES

(71) Applicant: Proteus Industries, Inc., Mountain View, CA (US)

(72) Inventor: Mark Nicewonger, Mountain View, CA (US)

(73) Assignee: PROTEUS INDUSTRIES INC., Mountain View, CA (US)

( * ) Notice: Subject to any disclaimer, the term of this patent is extended or adjusted under 35 U.S.C. 154(b) by 443 days.

(21) Appl. No.: 16/794,216

(22) Filed: Feb. 18, 2020

Related U.S. Application Data

(60) Provisional application No. 62/806,763, filed on Feb. 16, 2019.

(51) Int. Cl.
*B23K 11/30* (2006.01)

(52) U.S. Cl.
CPC ................ *B23K 11/3063* (2013.01); *B23K 11/3054* (2013.01)

(58) Field of Classification Search
CPC ............ B23K 11/3054; B23K 11/3063; B23K 11/3045; B23K 11/3018

USPC .......................................... 219/120
See application file for complete search history.

(56) References Cited

U.S. PATENT DOCUMENTS

| 2016/0067815 A1* | 3/2016 | Nicewonger | B23K 11/3072 |
| | | | 219/120 |
| 2017/0304927 A1* | 10/2017 | Klug et al. | B23K 31/027 |
| 2021/0162529 A1* | 6/2021 | Lim | B23K 11/115 |

* cited by examiner

*Primary Examiner* — Dana Ross
*Assistant Examiner* — Joe E Mills Jr.

(57) ABSTRACT

A system and method apparatus for purging liquid coolant from liquid coolant lines providing cooling to welding electrodes in a welding apparatus. The system provides a purging fluid of air at a pressure higher than a pressure of the liquid coolant to be purged. High-pressure air is generated by a centralized compressor and distribution system, a local electric pump, or existing robotic arm movements applied to pump bellows mounted thereon. A variety of placements, tie-ins, and hardware for fluid purging line(s) and its valve(s), for coolant supply(ies) and its valve(s), for coolant return(s) and its valve(s), and for liquid coolant line(s) and its valve(s) allow individual liquid coolant lines to be purged independently, with trade-offs of speed to purge, thoroughness of purge, amount of liquid coolant needed to be purged.

16 Claims, 7 Drawing Sheets

Figure 3:
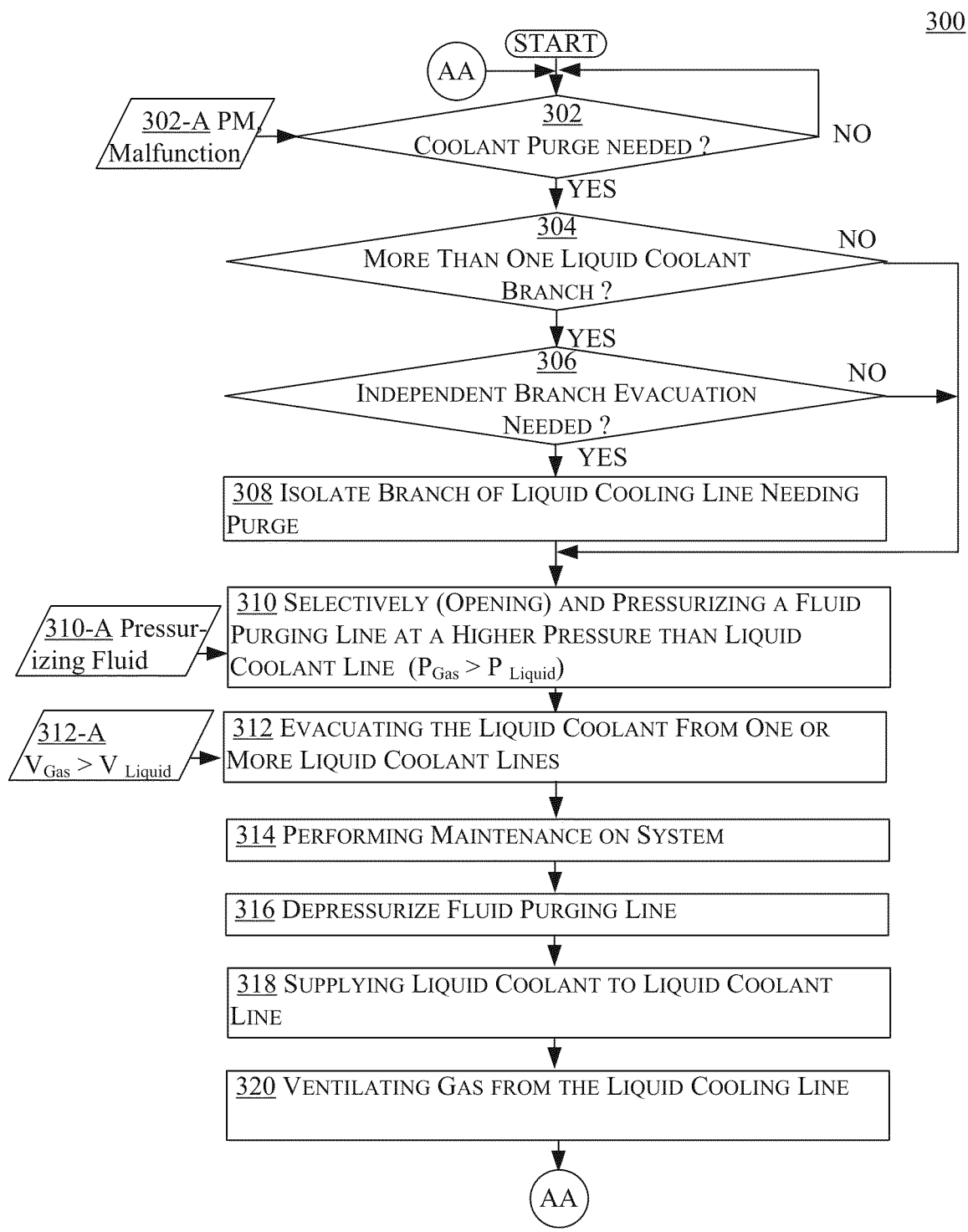

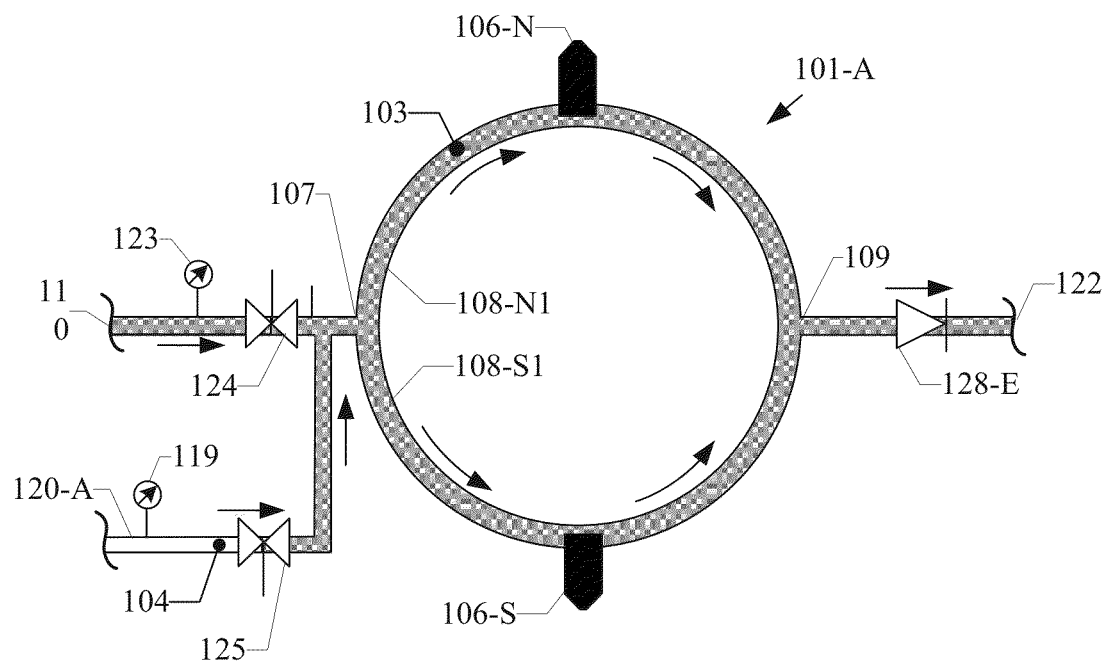
FIG. 1-A
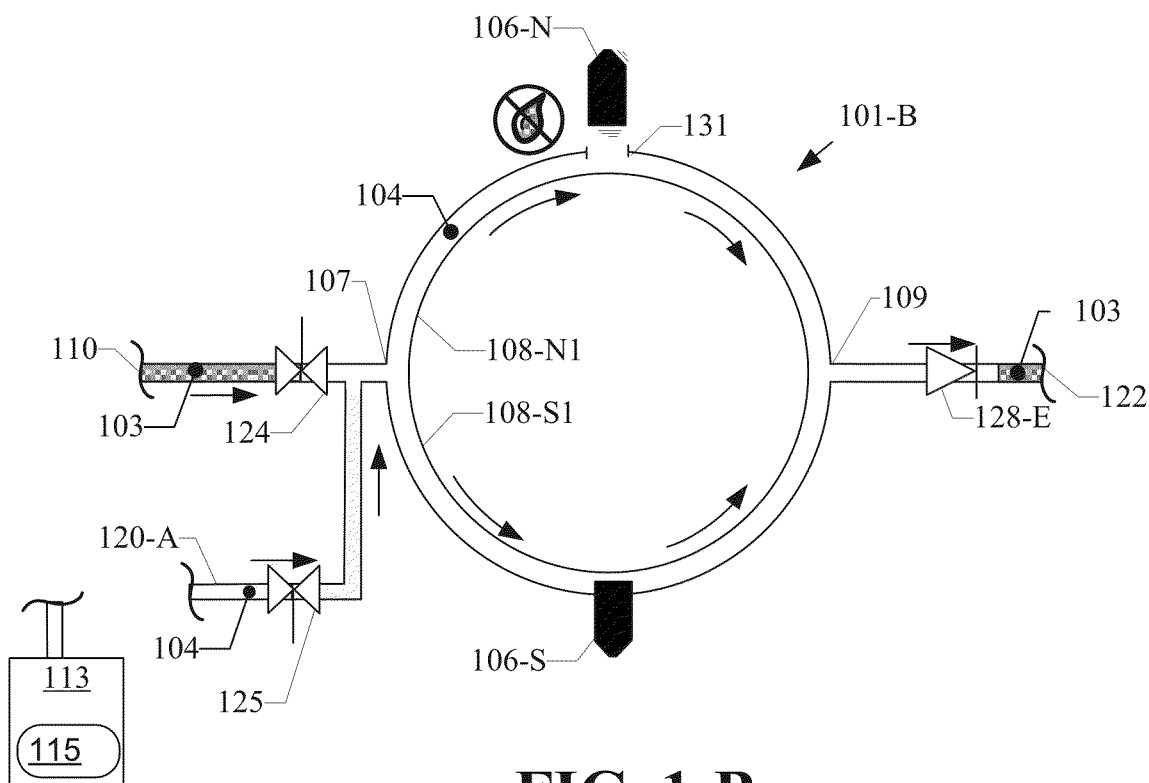
FIG. 1-B

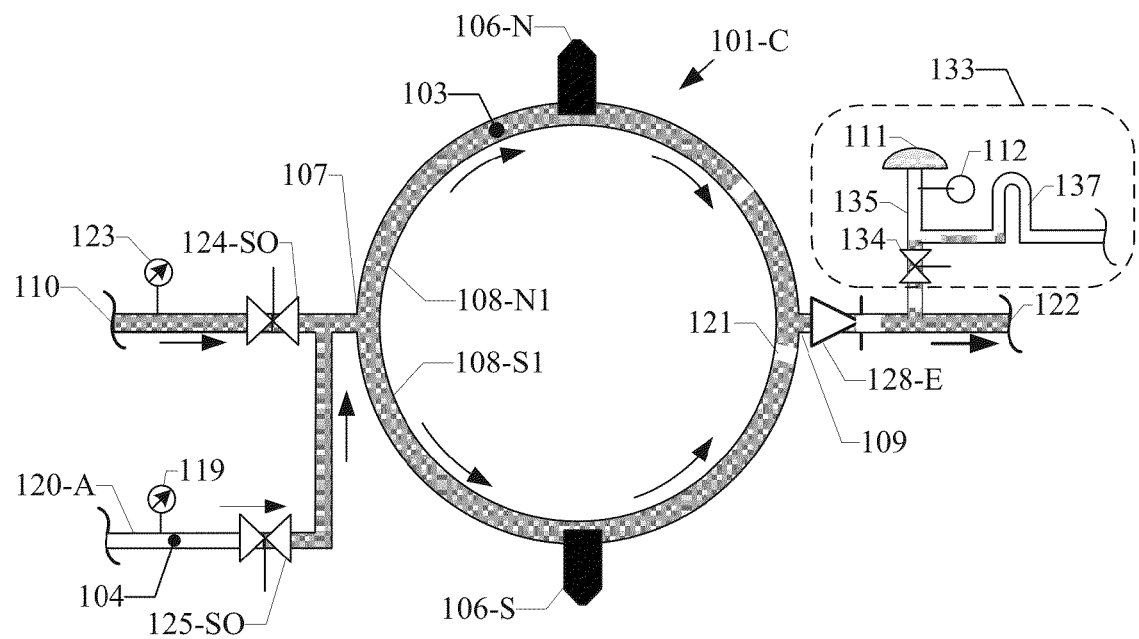
FIG. 1-C
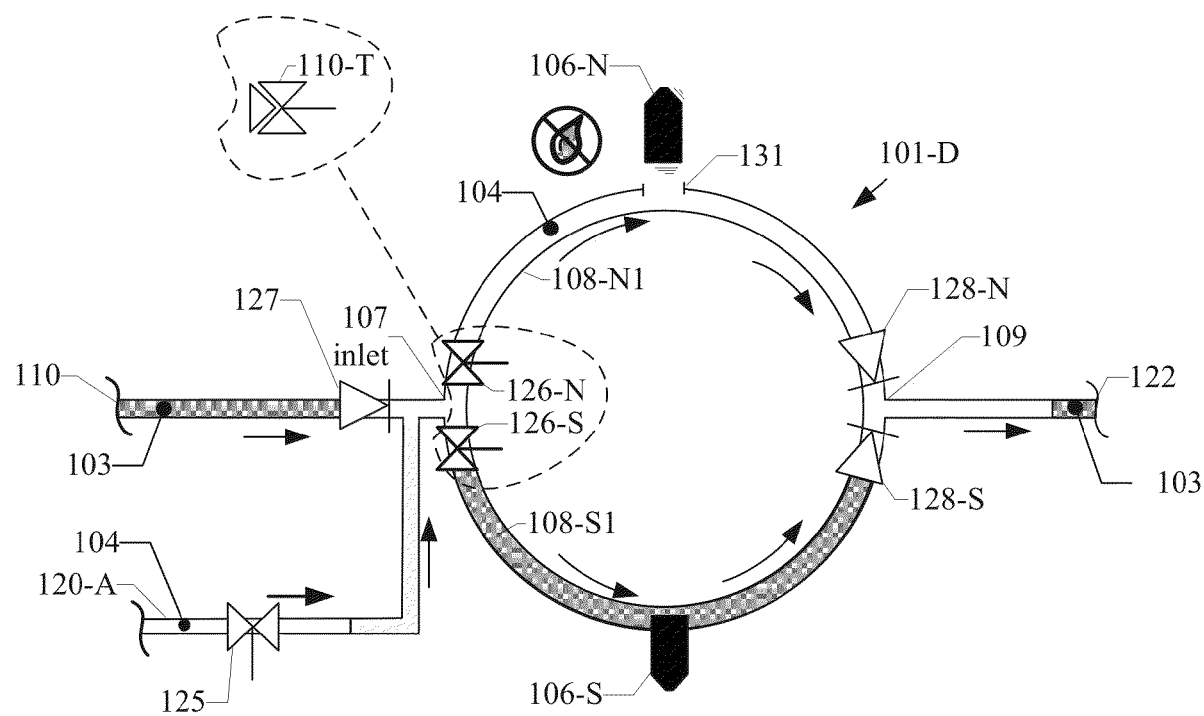
FIG. 1-D

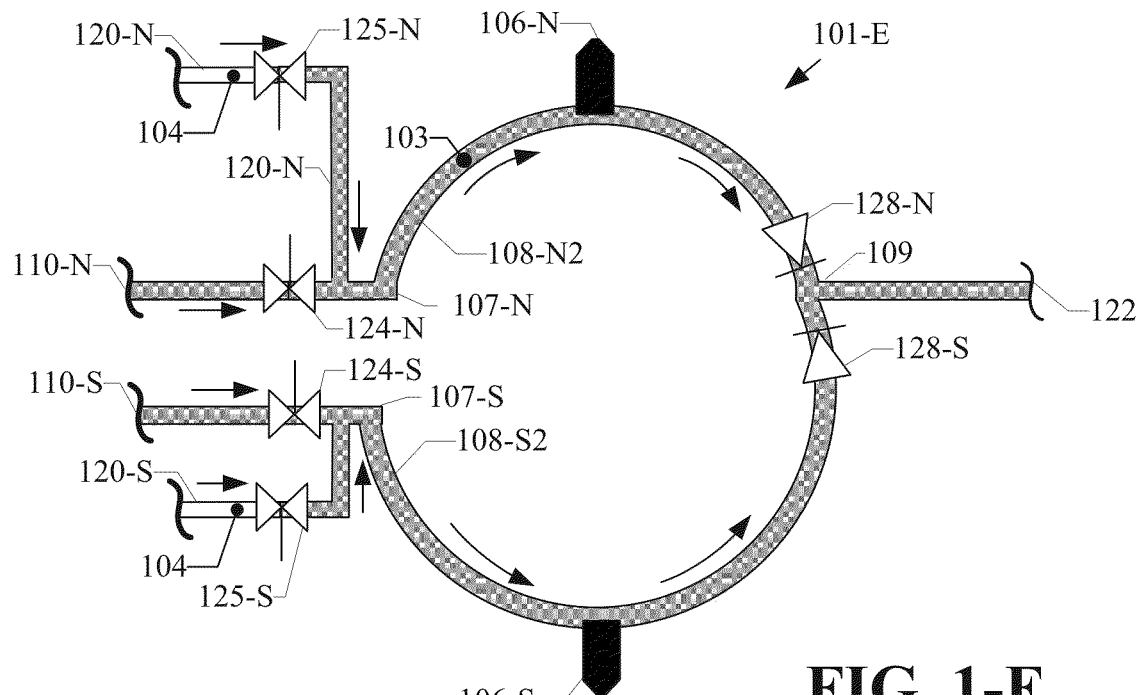
FIG. 1-E
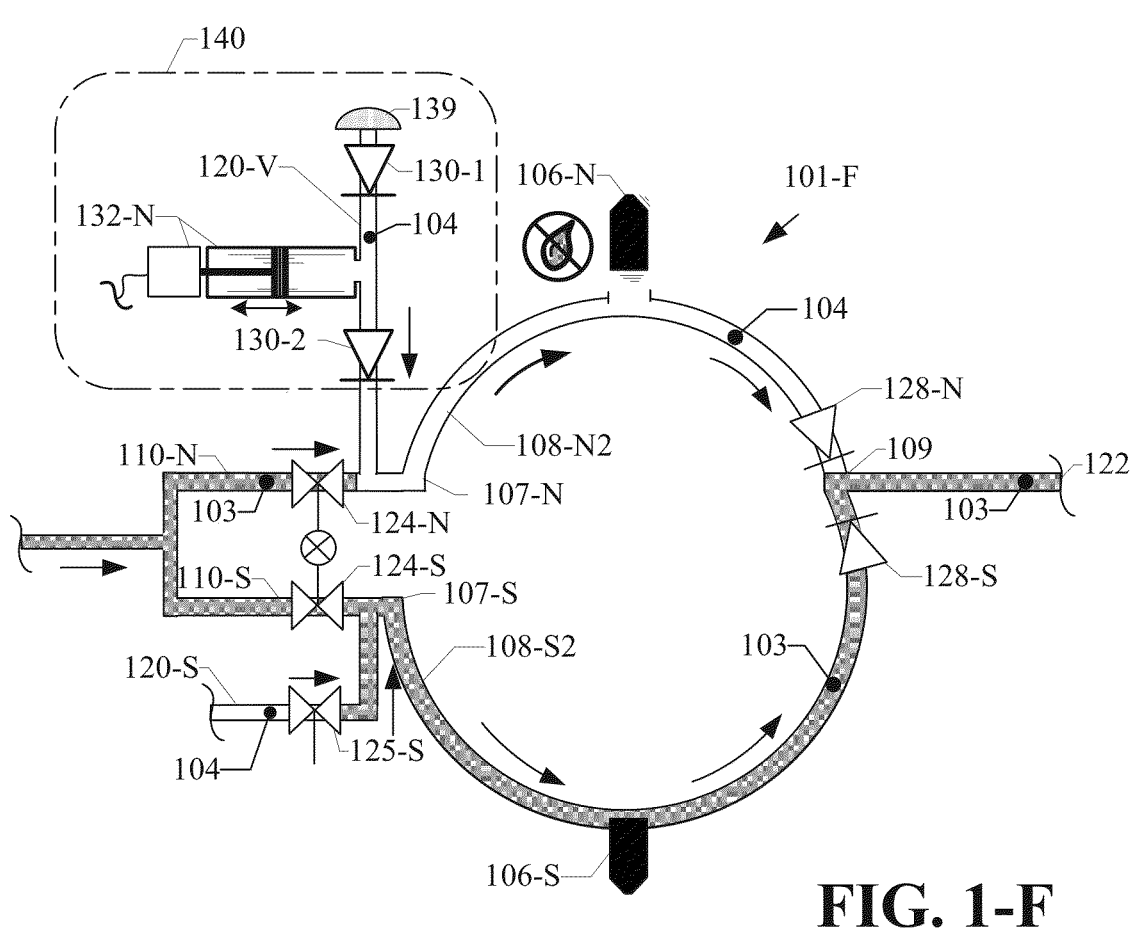
FIG. 1-F

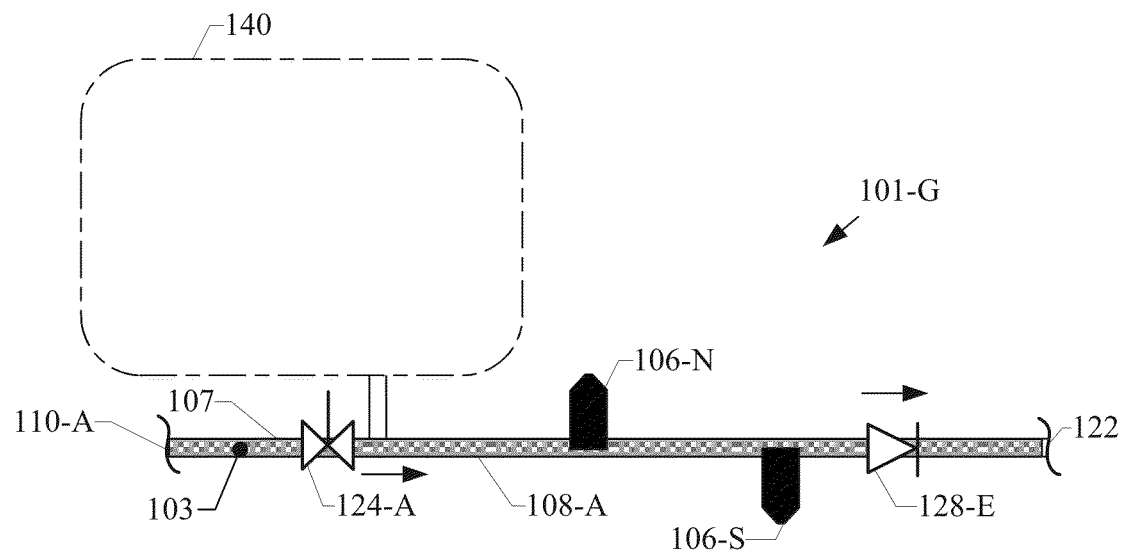
FIG. 1-G
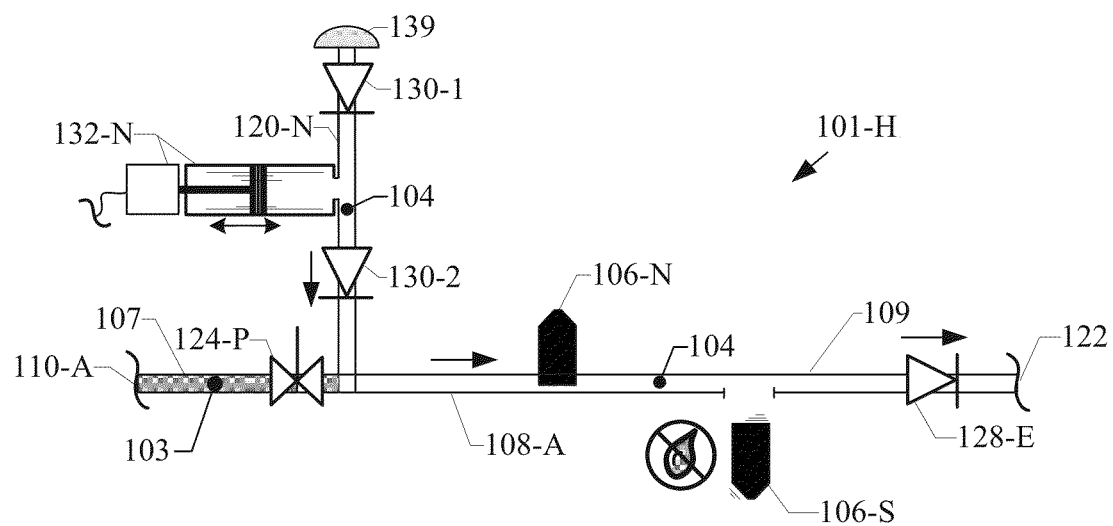
FIG. 1-H

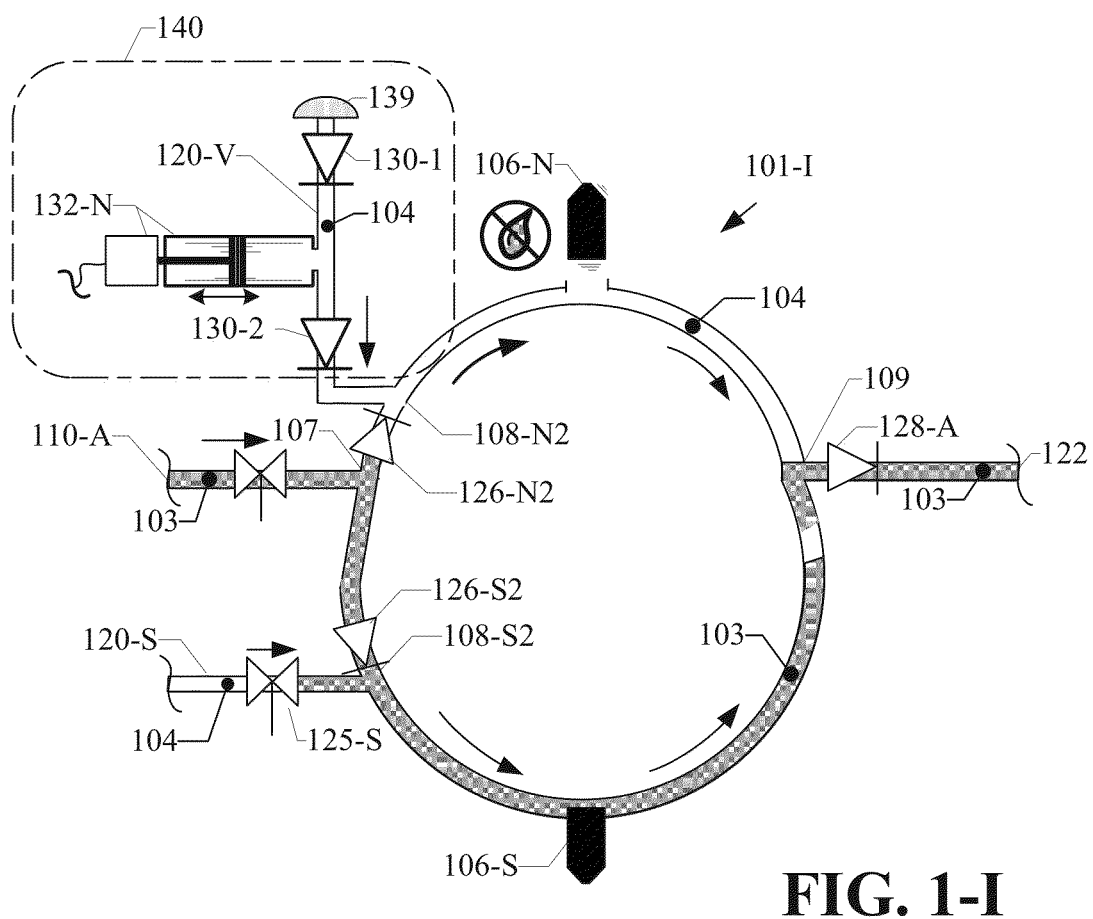
FIG. 1-I

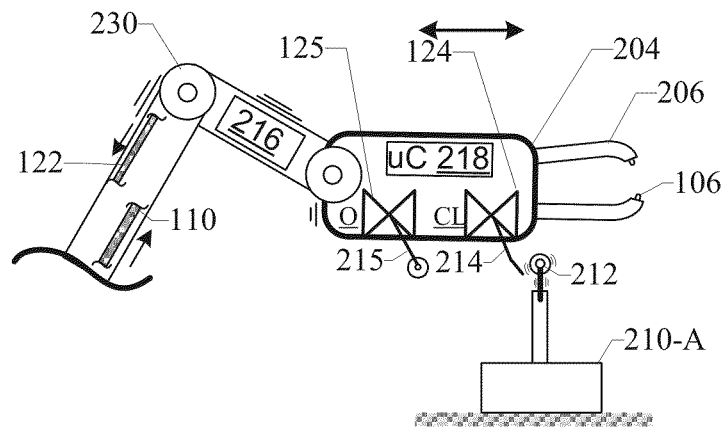
FIG. 2-A
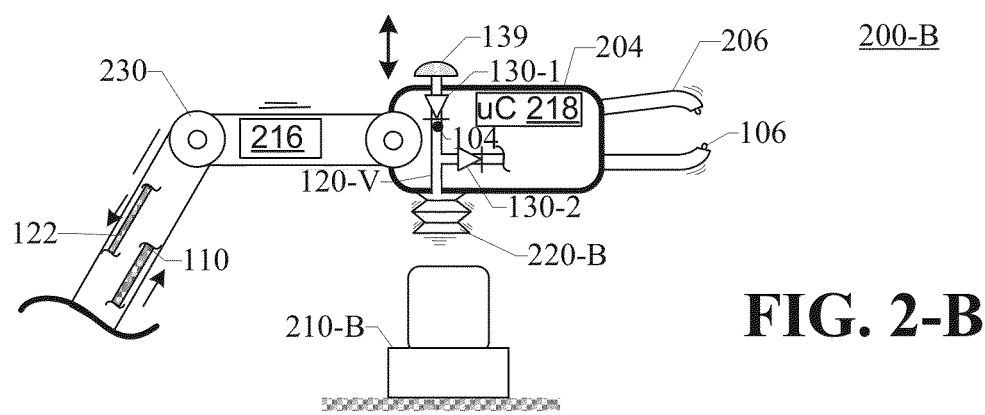
FIG. 2-B
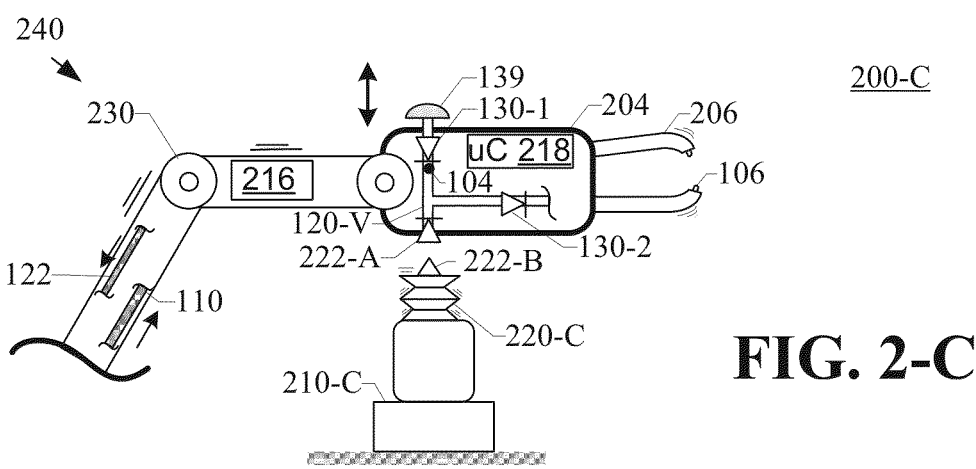
FIG. 2-C

REPURPOSED ROBOT MOTION FOR PURGING COOLANT FROM RESISTANCE WELDING ELECTRODES

CROSS-REFERENCE TO RELATED APPLICATIONS

This application claims priority to provisional application(s): Ser. No. 62806763, filed Feb. 16, 2019, titled "PURGING COOLANT FROM RESISTANCE WELDING ELECTRODES", the disclosures of all of said commonly owned applications are incorporated by reference herein in their entirety. Where a definition or use of a term in a reference, which is incorporated by reference herein, is inconsistent or contrary to the definition of that term provided herein, the definition of that term provided herein applies and the definition of that term in the reference does not apply.

FIELD OF TECHNOLOGY

The present invention(s) relate generally to cooling systems. More particularly, the invention(s) relate to systems and methods to evacuate coolant from a cooling system.

BACKGROUND

Resistance welding (e.g., spot welding) machines require cooling, or coolant, systems to maintain the spot welding (copper) tips below a maximum temperature. This prevents the electrodes from sticking to the sheet metal being spot-welded. Typically, circulating water-coolant systems are used to cool the spot welding machine electrodes.

The electrodes are designed to be periodically replaced for scheduled preventative maintenance, poor performance, or a failure. The base end of the electrode is immersed in a flowing coolant to remove heat. When an electrode is removed or replaced, the supply of liquid coolant can be blocked on a supply side, and on a return side, thereby creating a gap in the flow path, which is an isolated section of the coolant line with ideally zero pressure. However, residual water can remain and escape from the gap created in the flow path.

When an electrode is removed from the housing structure, it creates an opening, or a breach, in the coolant system. In the past, this liquid spillage created hazards for the welding equipment, the operations personnel, and/or high voltage and high current power supplies.

Although past systems may reduce spillage to some degree by simply shutting off liquid flow at the source when a welding electrode is lost or removed, this is not optimal because spillage can still occur from liquid already circulating in the coolant system. Past system designs have utilized a suction to pull liquid coolant back from a liquid coolant line where electrodes are planned to be removed.

SUMMARY

A method and system is disclosed for a) purging coolant from resistance welding electrode cooling lines using compressed air; b) locally generating the compressed, or pressurized, air; and c) utilization of robot motion to actuate (opening and closing) valves (e.g., shutoff, etc.) for the liquid coolant and/or the pressurized air; and d) robot motion for the pressurization of air.

The system for managing a liquid coolant for one or more welding electrodes in a welding apparatus includes at least one liquid coolant line including: at least one liquid coolant line comprising an inlet coupled to a coolant supply and an outlet coupled to a coolant return; at least one fluid purging line selectively coupled to the coolant supply or one or more of the at least one liquid coolant line. The liquid coolant line is coupled to the at least one welding electrode; and the fluid purging line delivers a gas (atmospheric air, treated air, nitrogen, etc.) at a pressure higher than a pressure of one or more of the at least one liquid coolant line so as to evacuate at least a portion of the liquid coolant from the at least one liquid coolant line.

The system further includes in one embodiment, a plurality of liquid coolant lines coupled to the coolant supply at an inlet and coupled to a coolant return at an outlet. A liquid coolant line is coupled to, and for providing cooling to, at least one welding electrode. A single robot station can have multiple welding electrodes, each having its own liquid cooling supplied by a liquid coolant line. The present disclosure contemplates all combinations, quantities, and arrangements of liquid coolant lines, and of welding electrode serial and parallel placements in the liquid coolant lines and of inlet and outlet placement. The specific choice of coolant line layout depends on a designer's goal for the degree of independence of each electrode to be purged.

In one embodiment, the at least one fluid purging line is a single fluid purging line to supply, or deliver, the gas to purge the liquid coolant from two or more (or all) of the plurality of liquid coolant lines. Purging can be accomplished in the present disclosure on a i) system level (all of the respective liquid coolant lines for access to their respective electrodes disposed therein) and/or on an ii) individual level per each single or serially paired electrode in a given liquid coolant line. The purging can be accomplished in a hybrid fashion as well, with a fast system purge followed by a serial individual liquid coolant line purge. The purging medium is a gaseous state, namely air, which is a different state than the liquid state coolant for the electrodes, which is water or aqueous heat-treated coolant, e.g., having a high specific heat value.

One system includes a plurality of liquid coolant lines and a plurality of fluid purging lines wherein at least one of the plurality of fluid purging lines is coupled independently to at least one of the plurality of liquid coolant lines. In another embodiment, a one-to-one pairing of fluid purging line to a respective liquid cooling line provides independent purging of each liquid cooling line, thereby avoiding trapped liquid coolant in uneven liquid coolant lines that don't clear well with a system purge applied to two or more liquid coolant lines simultaneously. With the present layout, each of the liquid coolant lines in the system can be closed and purged independently. This saves time and energy resources to purge.

At least one valve disposed in each of one or more of the at least one liquid coolant lines. The valve can be a shutoff valve or a check valve and can be used in combination with a valve in the coolant supply and/or the coolant return. Alternatively, two valves in each of the liquid coolant lines, on either side (upstream/downstream) of the welding electrodes, is sufficient for the purging operation, with no valve required in the coolant supply or the coolant return, e.g., one shut off and one check valve in each liquid coolant line or two shut off valves in each coolant line. Alternatively, at least one valve is disposed in the liquid coolant line downstream of the welding electrode to prevent backflow of liquid coolant when the electrode is pulled from the coolant line.

In one embodiment, a valve is disposed in the coolant supply to control (on/off) a flow of the liquid coolant to two or more of the at least one liquid coolant lines. The delivery of the gas to one or more of the at least one liquid coolant line actuates a valve to stop the flow of liquid coolant, e.g. by providing backpressure against a check valve in the liquid coolant line or in the coolant supply.

A valve disposed in the coolant return to stop a backflow of the liquid coolant to all of the at least one liquid coolant line. Together, a single shutoff valve in the coolant supply, a single shutoff or check valve in the coolant return, and a single valve in the liquid coolant line, is sufficient, without requiring more valves, to provide purging operations.

Lastly, at least one valve is coupled to the fluid purging line to prevent liquid coolant from entering the fluid purging line. This valve can be a check valve or a shutoff valve.

A pressurized fluid source coupled to the fluid purging line provides the high-pressure gaseous medium used to accomplish the purging of liquid coolant from the one or more liquid coolant lines. The pressurized fluid source is at least one of a positive displacement apparatus or a storage vessel. The pressurized fluid source has a capacity greater than a volume of the at least one liquid coolant line and the plurality of liquid coolant lines disposed between a shutoff valve and a check valve that are being purged.

In another embodiment, a local pressure generating apparatus is either i) an electrically driven pump; or ii) an unpowered pump that generates pressure from motion of a robot in which at least a portion of the system is disposed. Furthermore, one or more valves in the system can be actuated by a motion of a robot in which at least a portion of the system is disposed. Use of an existing robot mechanism and motion required for the welding operations, but repurposed with a slightly modified path and action for the pressure generation or valve actuation eliminates the requirement, the cost, the maintenance, etc., for separate pressure lines, electrical lines, etc. otherwise required for valve actuation, pressure generation, and other liquid coolant purging operations.

The present disclosure requires neither a drawback apparatus nor a suction pressure to evacuate the liquid coolant from the system. That is, a pressure for evacuating the liquid coolant less than the pressure of the liquid coolant is not required in the present system. A low-pressure evacuation system is less likely to purge residual pockets of liquid as effectively as a high-pressure system.

The system includes a vent to ventilate the gas from the system while retaining the liquid coolant. The vent can be at a cooling tower for the entire coolant system infrastructure, a local vent purge, or a combination of the two.

The present disclosure also includes a method for managing a liquid coolant for welding electrodes in a welding apparatus includes selectively opening a fluid purge line coupled to at least one liquid coolant line and supplying a gas to the fluid purging line at a pressure greater than a pressure of the liquid coolant line. This process evacuates the liquid coolant from the coolant line (downstream of the check valve or shutoff valve) and from the liquid coolant lines.

If a shutoff valve is disposed in the coolant supply and/or the liquid coolant line, then an operation closes shutoff valve to control and stop the supply of liquid coolant to the liquid coolant line, particularly at the location of a welding electrode. On the back end, backflow is restricted (stopped) in each of the liquid coolant lines downstream of the welding electrode; and/or in the coolant return, in order to prevent leakage from the coolant return to the housing where a welding electrode is removed, exposing that portion of the liquid coolant line to atmospheric pressure. This is accomplished via at least one valve disposed in the liquid coolant line downstream of the welding electrode or in the coolant return. After the inlet and the outlet of the liquid fluid line are secured, closed with no leaking, then operation can proceed for the opening of at least one valve coupled to the fluid purge line to provide high-pressure gas to evacuate the liquid coolant line.

Next, liquid coolant is evacuated from at least one of the liquid coolant lines using the gas from a single fluid purge line or a plurality of fluid purge lines. The gas in the fluid purging line is at a pressure higher than the pressure of the liquid coolant in the liquid coolant line. This is to ensure a more thorough evacuation of the liquid coolant. In addition, there is a drying effect of the blowing air though the liquid coolant lines that pulls out residual moisture and pockets of coolant. The volume of gas supplied to the liquid coolant line exceeds a volume of the liquid coolant lines trapped in the liquid coolant lines. In some cases the ratio of air volume is greater than the volume of the liquid coolant being displaced. The higher ratio of air volume ensures a more thorough evacuation, resulting in lower probability of leakage at the electrode removal point.

The following operations are performed parallely in the present embodiment i) closing a valve at the coolant supply, ii) selectively opening a valve in the fluid purging line, and iii) supplying a gas to a plurality of liquid coolant lines coupled in parallel to a given single coolant supply and a single coolant return. Each of the plurality of liquid coolant lines is independent and not coupled to each other downstream of an inlet, e.g., and upstream of an outlet. Upstream is a location towards the coolant source, higher pressure of the liquid coolant (before subsequent pressure drops), and/or an origin of a flow direction of the liquid coolant. This method allows the fast evacuation of multiple liquid coolant lines that are disposed in parallel to each other, with a single inlet and outlet on the liquid coolant line. In a default mode, all valves, if any, located in each of the liquid coolant lines would be open, and all lines would be purged in parallel as a first operation in purging the coolant lines for the welding machine.

Prior to, or during the purging, an operation is performed for pressurizing fluid into a pressurized fluid source coupled to the fluid purge line. Because the fluid used for purging is a compressible gas, and because the pump source is desired to be reasonably small and compact, a reservoir, bladder, tank, or other holding device for pressurized air is consequently used to hold the large volume of air needed for the purge operation. Thus, a positive displacement pump, a centrifugal pump, and/or a storage vessel can all be used for generating and then holding and storing the high-pressure gas, respectively. The operation of generating a local pressure by at least one of i) electrically pumping air; or ii) displacing an unpowered pump using motion from a robot in which at least a portion of the system is disposed.

The volume of gas from the pressurized fluid source that is greater than a volume of the liquid coolant line disposed between a shutoff valve and a check valve is provided through the fluid purge line(s) to the liquid cooling lines chosen to be purged. This operation is provided in sequence, after closing a (shutoff or check) valve in the coolant supply or in the at least one liquid coolant lines. However, in other embodiments, this gas pressurization step can occur prior to the closing of the shutoff valve for the inlet of the liquid coolant line. Valves in individual liquid coolant lines can be closed on each relevant liquid coolant line ensure sealing from liquid coolant after the high-pressure purging air is ceased and the check valve on the liquid coolant line is forward biased and allows liquid coolant to flow downstream.

After the system is purged of liquid coolant, then the purging high-pressure gas is ceased, the electrode is removed and replaced with a new electrode, and the system is verified as ready to re-pressurize. The remaining gas in the liquid coolant lines, notably, the portion between valves at the coolant supply and coolant return, e.g., especially the portion of the coolant line closest to the welding electrodes, is pumped out of the coolant system by the liquid coolant. The gas exiting the outlet of the liquid coolant line is ventilated from the welding apparatus downstream of a check valve coupled to the liquid coolant line.

Means for i) closing an inlet of a liquid coolant line that supplies the liquid coolant to a welding electrode; and ii) selectively opening a fluid purge line coupled to the liquid coolant line, can be any structure that effectuates the movement of a gate valve, a ball valve, or other valve that effectively prevents communication of pressure on either side of the valve. The means could be i) linear movement (e.g., a linear pneumatic, hydraulic, solenoid electrical actuator, etc.) or circular, rotational movement (e.g., a digital or analog motor drive, etc.). The means include manual operation, automated microcontroller operation of a mechanical or electrical motive force, or other re-purposed robotic motion The robotic motion would benefit from a robot arm or appendage that already has rotational or linear motion capability originally designed for the placement of electrodes on the end of a robot arm at different locations on a work piece, e.g. a unitized car body frame. In one case, a robotic arm or machine could actuate valves en route to a resting, seated, or home position of the arm. Additionally, using robot motion to actuate water and air valves is a reduction and simplification in the amount of equipment and infrastructure needed to accomplish these functions. No additional power source is required for the welding gun or for an independently powered purging unit in order to evacuate liquid coolant from the cooling system. The system can be extremely simple and low cost. The system can be small and lightweight, making it practical for mounting on welding guns. Air purge can remove water from electrodes more completely than other methods such as water drawback.

The means for generating a gas to the fluid purge line at a pressure greater than a pressure of the coolant line is for the purpose of evacuating the liquid coolant from the liquid coolant line. Any structure that can generate and deliver a pressurized gas is acceptable, including a mechanically pumped gas, a chemically induced gas creation, a thermally created gas, etc.

Any means can be used for providing a volume of gas from the pressurized fluid source that is greater than a volume of the liquid coolant line disposed between a shutoff valve and a check valve. The means would communicate the pressurized gas to the one or more liquid coolant lines in an effective way, without impeding pressure drops. This includes i) distant and centrally generated and stored gas that is distributed thought an infrastructure network of pressurized metal or plastic tubing or pipe; and ii) locally generated and/or stored gas pressure sans an inter-machine piping network, and supplied gas pressure, or robotic motion The methods, operations, processes, systems, and apparatuses disclosed herein may be implemented in any means for achieving various aspects, and may be executed in a form of a machine-readable medium, and/or a machine accessible medium, embodying a set of instructions that, when executed by a machine or a data processing system (e.g., a computer system), in one or more different sequences, cause the machine to perform any of the operations disclosed herein. Other features will be apparent from the accompanying drawings and from the detailed description that follows. Accordingly, the specification and drawings are to be regarded in an illustrative rather than a restrictive sense.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE VIEW OF DRAWINGS

Example embodiments are described by way of illustrations and are not limited by the figures of the accompanying drawings, wherein:

FIG. 1-A is a schematic of a filled liquid coolant system for a resistance welding machine with equal liquid coolant lines, according to one or more embodiments.

FIG. 1-B is a schematic of a purged liquid coolant system for a resistance-welding machine with equal dimension liquid coolant lines, according to one or more embodiments.

FIG. 1-C is a schematic of a liquid coolant system refilling after a recent purge, according to one or more embodiments.

FIG. 1-D is a schematic of a liquid coolant system purging a single liquid cooling line, according to one or more embodiments.

FIG. 1-E is a schematic of a filled liquid coolant system for a resistance-welding machine with independent liquid coolant lines and independent fluid purge lines in each liquid coolant line, according to one or more embodiments.

FIG. 1-F is a schematic of a filled liquid coolant system for a resistance-welding machine with single liquid coolant line with serially connected electrodes and localized air purge source, according to one or more embodiments.

FIG. 1-G is a schematic of a purged liquid coolant system for a resistance-welding machine with single liquid coolant line with serially connected electrodes and localized air purge source, according to one or more embodiments.

FIG. 1-I is a schematic of a liquid coolant system for a resistance-welding machine with purging line coupled to liquid cooling lines downstream of check valves, according to one or more embodiments.

FIG. 2-A is an illustration of a robotically actuated valve for the liquid coolant system, according to one or more embodiments.

FIGS. 2-B and 2-C are illustrations of a robotically generated pressurized air source for purging coolant, according to one or more embodiments.

FIG. 3 is a flowchart of an operation to purge liquid coolant system for a resistance-welding machine, according to one or more embodiments.

The drawings referred to in this description should be understood as not being drawn to scale, except if specifically noted, in order to show more clearly the details of the present disclosure. Same reference numbers in the drawings indicate like elements throughout the several views. Other features and advantages of the present disclosure will be apparent from accompanying drawings and from the detailed description that follows.

DETAILED DESCRIPTION

A method, apparatus and system is disclosed for a) purging coolant from resistance welding electrodes; b) locally generating a pressurized air source for purging coolant; and c) robotically actuating a shutoff valve for liquid coolant. In the following description, for the purposes of explanation, numerous specific details are set forth in order to provide a thorough understanding of the various embodiments. It will be evident, however to one skilled in the art that various embodiments may be practiced without these specific details.

Purging Coolant From Resistance Welding Electrodes

Referring now to FIG. 1-A, a schematic is shown of a filled liquid coolant system 101-A for a resistance welding machine with equal liquid coolant lines 108-N1, 108-S1, according to one or more embodiments. The present state of system 101-A is in an operational state for welding, with liquid coolant 103 flowing in liquid coolant lines 108-N, 108-S. Coolant system 101-A manages liquid coolant 103 for one or more welding electrodes 106-N, 106-S in a welding apparatus includes at least one liquid coolant line 108 comprising an inlet 107 and an outlet 109, at least one fluid purging line 120-A selectively pressure coupled to the at least one liquid coolant line 108-N1 or 108-S1. Flow direction is indicated by arrows from upstream to downstream. Liquid coolant lines 108-N1, 108-S1 are each coupled to i) at least one individual welding electrode 106-N, 106-S; and to ii) fluid purging line 120-A, which selectively delivers a gas 104 (e.g., atmospheric air, treated air, nitrogen, etc.) at a pressure, measured by pressure sensor 119, different (e.g., greater than) than a pressure, measured by pressure sensor 123, of the coolant supply 110. When the higher-pressure air 104 (no crosshatch) is pressure coupled to the coolant supply 110, it serves to evacuate the liquid coolant (crosshatched) from the liquid coolant lines 108-S1, 108-N1 to outlet 109.

The present embodiment illustrates a plurality of liquid coolant lines 108-N, 108-S, (one line for each welding electrode) coupled to coolant supply 110 and disposed between inlet 107 and outlet 109. A single robot station can have multiple welding electrodes, 106-N, 106-S each having its own liquid coolant line 108-N, 108-S, respectively, supplied by at least one coolant supply 110. The present disclosure contemplates all combinations, quantities, and arrangements of one or more liquid coolant lines and coupling arrangements to inlet 107, coolant supply 110, outlet 109, coolant return 122, and purging lines 120-A. The specific choice of coolant line layout depends on a designer's goal for the degree of independence of each electrode to be purged. Purging can be accomplished by the present disclosure on a i) system level (all of the multiple electrodes and respective liquid coolant lines) or on a ii) single liquid coolant line level. The present embodiment utilizes a single fluid purging line 120-E that supplies the gas to purge the liquid coolant 103 from two or more of the plurality of liquid coolant lines 108-N, 108-S. The purging medium is a gaseous state of air 104, which is a different state than the liquid state coolant for the electrodes, which is water or aqueous heat-treated coolant with a high specific heat value.

Shutoff valve 124, coupled on inlet side 107 of coolant supply 110, has two functions. In an 'open' position shutoff valve 124 communicates liquid coolant pressure and flow through liquid coolant lines 108-N, 108-S to maintain temperatures of electrodes 106-N, 106-S, respectively, below a maximum operating temperature. In a 'closed' position, shutoff valve 124 shuts off the pressurized liquid coolant 103 supply when an electrode 106-N or 106-S needs replacement, or when any kind of lead occurs in coolant system 101-A.

Shutoff valve 125, selectively coupled to the fluid purge line 120-E and to the coolant supply 110. Shutoff valve 125 cycles from an 'off' position, when the welding apparatus is operating acceptably for welding, to an 'on' position, when liquid coolant 103 needs to be purged, thereby pressure and flow coupling the purging fluid of air 104 into said coolant supply 110, and downstream liquid coolant lines 108-N, 108-S.

One-way valve 128-E, aka a check valve, is disposed in the outlet end 109 of liquid coolant line 120-E. Coolant supply 110 is the pipe, hosing, tubing, or other pressure device that communicates liquid coolant 103 into the coolant system 101-A, on the upstream side of liquid coolant lines 108-N1, 108-S1.

In the present embodiment, liquid coolant lines 108-N and 108-S are approximately symmetrical and equal lengths to each other. Consequently, both liquid coolant lines 108-N and 108-S do not require or have individual one-way valves therein. Instead both liquid coolant lines 108-N and 108-S rely on the single one-way valve 128-E on the outlet end 109 of the liquid coolant line 108, downstream of the junction of the liquid coolant lines 108-N and 108-S. One-way (check) valve 128-E prevents backflow from the outlet end 109 of coolant return 122 from seeping or flowing back into liquid coolant lines 108-N, 108-S when the electrode 106-N, 106-S is removed for servicing, thereby opening the liquid coolant lines 108-N and 108-S to atmospheric pressure.

While only two liquid coolant lines 108-N, 108-S are shown, any number of liquid coolant lines can be implemented. Likewise, the shape, length, and size of liquid coolant lines are arbitrary, wherein the present disclosure is adaptable to any said configurations. Similarly, while only two shutoff valves and one check-valve is illustrated in the present figure as a minimum number of valves required to operate the coolant system 101-A, additional valves and different types of vales are contemplated by the present disclosure to provide more options in flow control, and redundancy in preventing leakage.

Referring now to FIG. 1-B, a schematic is shown of a purged liquid coolant system 101-B for a resistance-welding machine with equal liquid coolant lines, according to one or more embodiments. With shutoff valve 124 in a 'closed' position, flow of, and pressurizing by, liquid coolant 103 into liquid coolant lines 108-N, 108-S was ceased. However, static liquid remains within liquid coolant lines 108-N, 108-S, and would leak out of the port, or housing, 131 when electrode, e.g., 106-N, is removed for servicing. Shutoff valve 125 in fluid purging line 120-A selectively couples pressurizing fluid, e.g., air 104, to coolant supply 110 downstream of closed shutoff valve 124 and to liquid coolant lines 108-N, 108-S.

Liquid needs to be removed from all locations between i) shutoff valves 124, 125, and ii) one-way valve 128-E, even if only one electrode 106-N is being removed. In other words, all liquid coolant 103 needs to be removed from liquid coolant lines 108-N and 108-S before an electrode removal can be performed. Failure to fully purge said locations, could result in residual liquid coolant 103 hiding in a mostly purged coolant system 101-B, only to leak out of port 131. Instead liquid coolant 103 should only exist on the high-pressure (upstream) side of shutoff valve 124, and on the downstream side of one-way valve 128-E. Use of high-pressure air 104, which is in a very dry state, purges system 101-B and has a much lower likelihood of residual liquid coolant 103 in liquid coolant lines 108-N, and 108-S than a suction (low-pressure) evacuation system.

In one embodiment, pressure generation 113 by a positive displacement pumps such as piston pump, is generated centrally and stored centrally in pressure vessel 115. The centralized system provides a ready supply of pressurized air volume to purge a maximum allowed quantity of coolant supplies 110 and liquid coolant lines, as defined by a system designer. Said pressurized air is distributed via metal or plastic hose, tubing, or pipe to one or more welding machines, each having a coolant system similar to 101-A.

After successful purging of liquid coolant 103 from relevant areas of coolant supply 110 (downstream of valve 124), and liquid coolant lines 108-N, 108-S, shutoff valve 125 is moved to a 'closed' position. This ceases the flow of pressurized air fluid 104 into coolant supply 110 and to liquid coolant lines 108-N, 108-S, and thereby allows the removal of electrode 106-N, with negligible or zero leakage of liquid coolant 103 from therein.

Referring now to FIG. 1-C, a schematic is shown of a liquid coolant system 101-C refilling with liquid coolant after a recent purge of said liquid coolant, according to one or more embodiments. Once an electrode has been replaced, and the coolant system 101-C is hermetically sealed, shutoff valve 124 for liquid coolant 103 is moved to an 'on' position to introduce the supply of coolant liquid 103 into liquid coolant lines 108-N, 108-S. The higher pressure operates check valve 128-E to allow liquid coolant to leave system 101-C. Pockets of air 121 are purged from the system by running liquid coolant 103 through coolant system 101 can be vented locally in local vent structure 133, and/or can be piped to a centralized fluid manifold and cooling tower.

One embodiment of a local vent apparatus 133 includes a riser manifold 135 coupled via shutoff valve 134 to outlet 109 of coolant return 122. Riser manifold has a vent 111 to atmospheric pressure for bleeding off air 104 trapped in liquid coolant 103. An inverted P-trap 137 creates a higher resistance path that forces air up to vent 111. Water sensor 112 determines when most of the air is purged from coolant system 101-C, and shutoff valve 134 can be moved from an 'open' position for venting to a 'closed' position for normal liquid coolant 103 operation to cool electrodes 106-N, 106-S.

Referring now to FIG. 1-D, a schematic is shown of a liquid coolant system 101-D, purging a single liquid cooling line, according to one or more embodiments. Liquid coolant system 101-D utilizes two shutoff valves 126-N, 126-S, one in each liquid coolant line 108-N1, 108-S1, respectively. This allows a quicker purge start as fluid purge valve 125 can be opened while liquid coolant is flowing in coolant system 101-D, and without explicitly turning a coolant supply shutoff valve. Instead, a higher pressure of air 104 pumped into fluid purge line 120-A automatically closes check valve 127 in coolant supply 110. For a local pressurized air source, shutoff valve 125 can be replaced with a check valve as well. This is because only when the local air pressure source is activated does it reach a sufficient pressure to open a check valve. Prior to that, the check valve would prevent liquid coolant 103 from reaching the local air pressure source. An alternative to individual shutoff valves 126-N, 126-S is three-way multi-port T-pattern ball valve 110-T. With the trunk of the T-pattern ball valve 110-T toward inlet 107 to receive liquid coolant 103 from coolant supply 110, it is supplied to both liquid coolant line 108-N1, 108-N2. When valve is turned for a 90-degree position it supplies purging air to liquid coolant line 108-N1, and when turned the other 90-degree position, it supplies purging air to liquid coolant line 108-S1. Finally, turning the T-pattern ball valve 110-T such that the stem of the 'T' is opposite inlet 107, and the through hole in the ball communicates between liquid coolant branches 108-N1 and 108-S1, while shutting off any purging air 104 or liquid coolant 103 at inlet 107.

Referring now to FIG. 1-E, a schematic is shown of a filled liquid coolant system 101-E for a resistance-welding machine with independent liquid coolant lines and independent fluid purge lines in each branch liquid coolant line, according to one or more embodiments. Independent liquid coolant lines 108-N2, 108-S2 and fluid purge lines 120-N, 120-S allows more thorough purging of the liquid coolant lines 108-N2, 108-S2 in a case where both branch liquid coolant lines do not purge equally well when using a single inlet and outlet liquid coolant line, shown in a prior figure. This configuration also allows replacement of a single electrode 106-N at a time, without having to purge liquid coolant unnecessarily (e.g., from liquid cooling line 108-S2).

The present coolant system 101-E includes a plurality of liquid coolant lines 108-N2, 108-S2 and a plurality of one-to-one paired fluid purging lines 120-N and 120-S with at least one of the plurality of fluid purging lines 120-N coupled independently to at least one of the plurality of liquid coolant lines 108-N2. With coolant system 101-E layout, each liquid coolant line 108-N2, 108-S2 can be closed and purged independently of the other. This saves resources of time and energy to purge and replace liquid coolant 103

Coolant system 101-E also includes two liquid coolant lines 108-N and 108-S and two shutoff valves 124-N and 124-S, each respectively dedicated to a liquid coolant line 108-N2, 108-S2. Similarly, two check valves 128-N and 128-S are used in coolant system 101-E, with one coupled to each are each independently dedicated to a liquid coolant line 108-N2, 108-S2, respectively. Thus, each liquid coolant line 108-N2, 108-S2, can operate independently of the other, say for example, when only one welding electrode needs to be serviced.

Referring now to FIG. 1-F, a schematic is shown of a purged single liquid coolant line in liquid coolant system 101-F for a resistance-welding machine with independent liquid coolant lines and independent fluid purge lines in each liquid coolant line, according to one or more embodiments. As noted in the prior figure, one liquid coolant line, i.e., 108-N2, can be purged independently of the other liquid coolant line, i.e. 108-S2, with the associated benefits mentioned.

In case a centralized or systemic source of pressurized air is not available to purge the electrodes, pressurized air may be generated in a local pressure generating unit 140 by the movement of an air pressure generating device, e.g., bellows, air bladder, air cylinder/piston, 132-N to draw fresh air from atmosphere via inlet 139 with filter. The fresh air 104 is compressed by motion of the pressure generating device 132-N and pumped through the liquid coolant lines. If the pressure generating device 132-N is actuated on demand, i.e., when pressurized air is needed to purge the liquid coolant lines, the air supply control valves may be a simple series of check valves 130-1, 130-2 to direct the flow of fresh air into the pressure generating device and direct pressurized air to the liquid coolant line to clear the electrode cooling path of the liquid coolant. The pressure-generating device 140 may be actuated manually or by some form of electrical actuator.

Localized Apparatus for Generating a Pressurized Air Source

Referring now to FIG. 1-G, a schematic is shown of a filled liquid coolant system 101-G for a resistance-welding machine with single liquid coolant line 110-A with serially connected electrodes 106-N, 106-S and localized air purge source 140, according to one or more embodiments. Any air purge source can be used in any of the coolant systems described herein, whether locally generated such as 140, or a main pressurized shop line fed pressurized air. Different embodiments are shown with different pressurized air sources to illustrate different applications and combinations.

Coolant system 101-G operates similarly to previously described coolant systems (with circular liquid coolant lines), albeit with a single liquid coolant line. The inclusion of two electrodes in the same liquid coolant line requires the liquid coolant line to be purged for either or both electrodes 106-N, 106-S, be removed or replaced. In lieu of a systemic air pressure supply, the present cooling system 101-G is designed with localized air purge source 140. Coolant system 101-G provides for a very reliable and robust system with no more than four total valves required for operation of coolant liquid and of purging fluid.

Referring now to FIG. 1-H, a schematic is shown of a purged liquid coolant system 101-H for a resistance-welding machine with single liquid coolant line and serially connected electrodes and a localized air purge source, according to one or more embodiments. As described in prior figures, the high-pressure air 104 purged line enables removal and/or replacement of an electrode, i.e., 106-S, without any leakage of fluid.

Referring now to FIG. 1-I, a schematic is shown of a liquid coolant system 101-I for a resistance-welding machine with purging line coupled to liquid cooling lines downstream of check valves, according to one or more embodiments. Independent fluid purge lines 120-Vand 120-S are coupled respectively to a first liquid coolant line 108-N2 and 108-S2. This provides a smaller volume of liquid coolant to purge from liquid coolant lines 108-N2 and 108-S2, and avoids liquid coolant in coolant supply 110-A upstream of check-valves 126-N2 and 126-S2, respectively. Separate liquid coolant lines 108-N2 and 108-S2 allows independent purging for unequal coolant line sizes, lengths, contours, paths, etc. that would otherwise make complete purging of each of the liquid coolant lines difficult.

Robotically Actuated Shutoff Valve

Referring now to FIG. 2-A, an illustration is shown of an actuation system 200-A for a robotically actuated valve for the liquid coolant system, according to one or more embodiments.

Actuation system 200-A includes: an apparatus for mechanical motion for a first and primary function, i.e., one or more segments of a robot arm 230 coupled for performing a spot welding operation using welding head 204. The actuation system is re-purposed for a secondary purpose of actuating a valve 124, 125 via a handle 214, 215, respectively, that opens and closes flow in a liquid coolant line 108 and a purging fluid coolant line 120, respectively. In one embodiment, when robot arm 230 is moved to be parked in a resting position for electrode replacement, it can be programmed en route to the resting position to actuate valves in furtherance of the electrode replacement. Actuation system further includes a fixed stop 212 disposed proximate to the welding apparatus; and wherein: the mechanical motion of the mechanism creates at least a partial interference between the handle 214, 215 of the valve 124, 125 and the fixed stop 212.

In one embodiment, handle 214 of shutoff valve 124 is pushed to a closed "(CL)" position as the welding head 218 is moved towards the right of the figure by robotic arm 230 and encounters fixed stop 212. This closes the liquid coolant line pressure and flow to the liquid coolant lines 108-N, 108-S as shown in FIG. 1-B. As the robotic arm 230 continues to the right, it then pushes handle 215 of shutoff valve 125 into an open ("O") position, and thereby opens fluid purging line 120 to purge liquid coolant lines 108-N, 108-S with air 104, as shown in FIG. 1-B. After purging liquid coolant 103, robot arm can again be programmed to move in the opposite direction to close valve 125 against fixed stop 212 based on a measurement of elapsed time to effectuate the purge, a moisture detection sensor in outlet 109 of liquid coolant line 108 to confirm no liquid is detected, or a combination of the two parameters. Then, following electrode replacement, as robot arm 230 prepares to restart its welding operation, it passes by fixed stop 212, and actuates handle 214 of valve 124 to allow liquid coolant flow and pressure back into the liquid coolant lines 108-N, 108-S.

Fixed stop 212 in the present embodiment is disposed on at least one of: i) the welding apparatus (not shown) or ii) an object, e.g., pedestal 210-A, other than the welding apparatus that is proximate to the welding apparatus. In one embodiment, fixed stop 212 includes a breakaway portion using a spring action; the spring action of the fixed stop selectively yields to a protruding portion of the valve handle after actuation. The fixed stop is symmetrical from a first side to a second side (e.g., left and right side when facing it sideways), one-hundred eighty degrees apart. The first side of the fixed stop is for actuating the valve to an open position, and the second side is for actuating the valve to a closed position. However, valves can be biased in opposite directions or same directions for open and closed depending on system requirements. Lastly, the fixed stop comprises a roller on top of fixed stop 212 that rolls against the handle of the valve during actuation of the valve.

Furthermore, the mechanism of the welding apparatus is programmable to move such that the handle of the valve is proximate to the fixed stop in order to actuate the valve. The valve is a quarter-turn valve that can be actuated on or off with an approximate ninety-degree swing of the handle. The mechanism and mechanical motion are a legacy function of the welding apparatus. Notably, a separate actuator is not required to actuate the valve in the present embodiment.

Most specifically, the welding apparatus is a robotic spot welder; the mechanism with mechanical motion is a robot arm; the mechanical motion is at least one of a linear or a rotational displacement of the robot arm; the valve is a ball-valve with a quarter-turn handle, that opens or closes flow of a liquid coolant; the fixed stop is disposed atop a floor pedestal; and the robot arm forcibly displaces the handle of the valve into at least a partial interference against the fixed stop to actuate the ball-valve.

The system for actuating a valve for an automated welding operation, includes means for generating a mechanical motion from a mechanism on a welding apparatus; means for moving a valve past a fixed stop disposed proximate to the welding apparatus; and means for displacing a handle of the valve against at least a partial interference from the fixed stop; and means for opening or closing the valve coupled to a liquid coolant line. In addition, one embodiment employs any means for preventing backflow into the positive displacement apparatus.

The advantages of a robotically actuated water purge system are that robot motion can be utilized to actuate water shutoff valves and air pressure generators. No additional power source is required on the welding gun or elsewhere with the present embodiment in order to purge liquid coolant from the electrodes. The system can be extremely simple and low cost. The system can also be small and lightweight, making it practical for mounting on welding guns. Air purge can remove water from electrodes more completely than other methods such as water drawback.

Robotically Generated Localized Pressure Generation

FIGS. 2-B and 2-C are illustrations of a robotically generated pressurized air source for purging coolant, according to one or more embodiments.

Specifically, the systems 200-B, 200-C for generating pressurized air in a welding apparatus and operation includes: i) a welding apparatus that further include: a mechanism with mechanical motion, e.g., robotic arm 230; and a fluid purging line 120-V to communicate the pressurized air 104; and ii) a positive displacement apparatus, e.g., bellows 220-B, 220-C, respectively, comprising a displaceable interface; and wherein: in one embodiment the mechanism of the welding apparatus includes a coupleable interface 222-A to the positive displacement apparatus interface 222-B to generate the pressurized air 104.

The positive displacement apparatus is disposed, in different embodiments, on at least one of: i) the head unit 204 of welding apparatus 240 as bellows 220-B of FIG. B or ii) an object other than the welding apparatus that is proximate to the welding apparatus, shown as bellows 220-C in FIG. C. The pressurized fluid source does not require external power in the present embodiment to power a positive displacement pump directly, such as an electrically operated piston pump requires an separate electrical line to the displacement pump itself. Rather, the present positive displacement apparatus utilizes existing power sources in the robot apparatus 200-C that move the robotic arm 230 to generates the force to compress bellows, e.g., 220-B. This avoids extra complexity, cost, and maintenance from installing another dedicated power source for the positive displacement apparatus. The apparatus and operation of check valves 130-1, 130-2, vent 139, and purging fluid line arrangement herein is similar to that of FIG. 1-F. Furthermore, the positive displacement apparatus is not required to generate suction pressure or a drawback motion on the fluid line in the present embodiment.

The system further includes, in the present embodiment, a valve 130-1 coupled to the positive displacement apparatus to prevent backflow of liquid coolant (103 shown in prior FIG. 1-F. The mechanism with mechanical motion is at least one of an actuator, a servo, or stepper motor; and wherein: the mechanism is disposed on the machine to exert a load on the pressurized fluid source against another object.

The positive displacement apparatus in the present embodiment has a volume greater than a displaceable volume of a given liquid coolant line. Additionally, the positive displacement apparatus has a diameter size to provide a pressure greater than a pressure of a given liquid coolant line.

In one embodiment, a weight of a portion of the welding machine 240 is disposed at an elevation higher than pressurized fluid source; and the weight of the portion of the machine provides at least a portion of the force to pressurize the pressurized fluid source.

Additionally, one embodiment of the present disclosure includes a vent 139 to ventilate the fluid from the system, while retaining the coolant. In general, the mechanical motion of the mechanism is primarily for welding operation and is repurposed for generating the pressurized air.

Most specifically, in the present system embodiment the welding apparatus is a robotic spot welder; the mechanism with mechanical motion is a robot arm; the mechanical motion is a linear or rotational displacement of the robot arm; the positive displacement apparatus is a bellows or a piston/cylinder; and the robot arm is forcibly displaceable against the positive displacement apparatus to compress the positive displacement apparatus and generate a pressurized fluid source of pressurized air inside the positive displacement apparatus.

The present embodiment can be implemented in a method for generating pressurized air in a welding operation, with the method including the operations of generating a mechanical motion from a mechanism on a welding apparatus; displacing a positive displacement apparatus from the mechanical motion to generate pressurized air; and communicating the pressurized air to a fluid line.

Additional operations include disposing the positive displacement apparatus on at least one of: i) the welding apparatus or ii) an object other than the welding apparatus that is proximate to the welding apparatus. Notably, the operation of displacing the positive displacement apparatus does not require external power. In addition, neither suction pressure on the fluid line nor a drawback motion on the fluid line is required of the positive displacement apparatus, in the present embodiment. One operation includes preventing backflow of liquid coolant into the positive displacement apparatus.

Further operations in the present embodiment include actuating the mechanism with mechanical motion by electrical, hydraulic, or mechanical means; and exerting a load on the positive displacement apparatus against another object. Additionally, one embodiment includes the operation of ventilating air from the system while retaining the coolant.

Most specifically, in one embodiment the welding apparatus is a robotic spot welder; the mechanism with mechanical motion is a robot arm; the mechanical motion is a linear or rotational displacement of the robot arm; the positive displacement apparatus is a bellows or a piston/ cylinder; and the robot arm is forcibly displaceable against the positive displacement apparatus to compress the positive displacement apparatus and generate a pressurized fluid source of pressurized air inside the positive displacement apparatus.

In one embodiment, the system for generating pressurized air in a welding operation, the system includes means for generating a mechanical motion from a mechanism on a welding apparatus; means for displacing a positive displacement apparatus using the mechanical motion to generate pressurized air; and means for communicating the pressurized air to a fluid line.

Finally, the system includes means for preventing backflow of liquid coolant into the positive displacement apparatus.

Flowchart

FIG. 3 is a flowchart 300 of an operation to purge liquid coolant system for a resistance-welding machine, according to one or more embodiments. Flowchart 300 is implemented, in at least one embodiment, via coolant systems described in aforementioned FIGS. 1-A through 1-I, and FIGS. 2A-2C. Flowchart has applications both in design and hardware configuration of coolant systems described herein as well as operation of those coolant systems.

Flowchart 300 starts with a first operation of inquiring whether coolant needs purging. If coolant does not require purging, then system remains passive until activated. Input 302-A provides a timing and indication for when coolant requires purging, e.g. for preventative maintenance (PM), or a malfunction detection. In another embodiment, an active sensing operation detects a leak or other malfunction in the coolant system, and one detected, implements coolant purge. Sensing operation for malfunction includes one or more parameters of pressure, flow rate, temperature, etc. An example is a loss of a welding electrode, which would thereby breach the pressure and sealing integrity of the coolant system.

If coolant requires purging, then operation 304 inquires whether more than one liquid coolant line exists. This feature is usually designed and implemented in static hardware in the present embodiment, e.g., how many welding electrodes and respective liquid coolant lines will be operated full time. If a response is 'no' for operation 304 as for only one liquid coolant line 108 being i) designed in the coolant system, as illustrated in hardware configured line 108-A in FIGS. 1-G and 1-H, or ii) for only one liquid coolant line being configured to be purged, e.g., line 108-N2 in FIGS. 1-F or 1-I, then flowchart proceeds to operation 310. If a response is 'yes' to operation 304, with more than one liquid coolant line being operated and purged, then flowchart proceeds to operation 306.

In operation 306, an inquiry determines whether liquid coolant lines need independent evacuation of liquid coolant. This operation is important to make the goal of negligible or zero leakage from coolant system during electrode replacement. In a balanced coolant loop, similar to FIG. 1-B, liquid coolant is purged equally well from both liquid coolant lines 108-N and 108-S, then the response to inquiry 306 is 'no' and independent evacuation of liquid coolant is not required.

However, if the response is 'yes' to inquiry 306, then one or more liquid coolant lines fail to sufficiently evacuate or purge liquid coolant during a single, and consequently operation 308 is required. This is the scenario in a whole-system purge operation of two or more liquid coolant lines in parallel, as illustrated in FIGS. 1-D, 1-E, 1-F, and 1-I. In this scenario, a single liquid coolant line purge is utilized for each of the multiple liquid coolant lines, or at least a liquid coolant line that does not purge fully with the single whole-system purge operation. FIG. 1-E has separate liquid coolant line valves 124-N, 124-S to allow each liquid coolant line to be purged independently.

Operation 310 selectively opens and pressurizes a fluid purging line at a higher pressure (P), and communicates said pressure to liquid coolant lines, which has a lower pressure. Input 310-A is pressurized fluid, e.g., air, from shop air, local electrically generated piston air pump, or use of robotic symbiotic motion to generate air pressure.

Operation 312 evacuates liquid coolant from one or more liquid coolant lines. Operation 3134 allows for the performance of maintenance on the system, such as replacement of welding electrodes. Operation 316 depressurizes fluid purging line after maintenance is complete and coolant system is hermetically sealed. Operation 318 supplies liquid coolant back into liquid coolant system and speciffically to liquid coolant line. Operation 320 ventilates gas from the liquid coolant line. Afterwards, operation is returned to start and inquiry 302.

Alternatives

The above advantages are exemplary, and these or other advantages may be achieved by the invention. Further, the skilled person will appreciate that not all advantages stated above are necessarily achieved by embodiments described herein.

In the foregoing specification, the invention has been described with reference to specific examples of embodiments of the invention. It will be evident, however, that various modifications and changes may be made therein without departing from the broader spirit and scope of the invention as set forth in the appended claims.

Methods and operations described herein can be in different sequences than the exemplary ones described herein, e.g., in a different order. Thus, one or more additional new operations may be inserted within the existing operations or one or more operations may be abbreviated or eliminated, according to a given application.

Other features of the present embodiments will be apparent from the accompanying drawings and from the detailed description. In addition, it will be appreciated that the various operations, processes, and methods disclosed herein may be carried out, at least in part, by processors, electrical user interface controls under the control of computer readable, and computer executable instructions stored on a computer-usable storage medium. The computer readable and computer executable instructions reside, for example, in data storage features such as computer usable volatile and non-volatile memory and are non-transitory. However, the non-transitory computer readable and computer executable instructions may reside in any type of computer-usable storage medium.

The foregoing descriptions of specific embodiments of the present disclosure have been presented for purposes of illustration and description. They are not intended to be exhaustive or to limit the invention to the precise forms disclosed. Many modifications and variations are possible in light of the above teaching without departing from the broader spirit and scope of the various embodiments. The embodiments were chosen and described in order to explain the principles of the invention and its practical application best and thereby to enable others skilled in the art to best utilize the invention and various embodiments with various modifications as are suited to the particular use contemplated. It should be appreciated that embodiments, as described herein, can be utilized or implemented alone or in combination with one another. While the present invention has been described in particular embodiments, it should be appreciated that the present invention should not be construed as limited by such embodiments, but rather construed according to the claims appended hereto and their equivalents. The present invention is defined by the features of the appended claims.

I claim:

1. A robotic welding system with a liquid coolant, the system comprising:
    a robot comprising at least a portion that can move; and
    a welding apparatus coupled to the robot, wherein the welding apparatus comprises at least one welding electrode; and wherein:
        the at least one welding electrode is cooled by the liquid coolant; and the portion of the robot that can move is required for a welding function other than to control a flow of the liquid coolant; and the portion of the robot that can move is repurposed to actuate at least one of a local air pressure generating apparatus or a valve.

2. The system of claim 1 wherein:

the local air pressure generating apparatus comprises an unpowered pump that generates pressure from the portion of the robot that can move; and wherein:

the local air pressure generating apparatus does not require external power.

3. The system of claim 2 wherein:

neither a drawback apparatus nor a suction evacuation system is required to evacuate the liquid coolant from the system.

4. A method for managing a liquid coolant in a robotic welding system, the method comprising:

operating a portion of a robot in the robotic welding system that can move as required for a welding function other than to control a flow of the liquid coolant; and repurposing the portion of the robot that can move to control the flow of the liquid coolant.

5. The method of claim 4 further comprising:

generating a local pressure by displacing an unpowered pump using motion from at least the portion of the robot that can move; and wherein:

the operation of generating the local pressure does not require external power.

6. The method of claim 4 further comprising:

actuating one or more valves by the portion of the robot that can move; and wherein:

the portion of the robot that can move is required for the welding operations, but is repurposed for valve actuation.

7. The method of claim 5 wherein:

an operation of evacuating the liquid coolant from at least a portion of the system requires neither a drawback apparatus nor suction.

8. A system for purging a liquid coolant from at least one welding electrode disposed in a welding apparatus, the system comprising:

means for controlling flow of the liquid coolant from a coolant supply to the at least one welding electrode via at least one liquid coolant line;

means for moving a portion of a robot for a welding function other than for the means for controlling flow of the liquid coolant; and means for repurposing the means for moving the portion of the robot to actuate at least one of a local air pressure generating apparatus or a valve.

9. The robotic welding system of claim 1 wherein:

the portion of the robot that can move is a robot arm.

10. The robotic welding system of claim 9 wherein:

one or more of the at least one welding electrode is disposed on the robot arm.

11. The robotic welding system of claim 1 wherein:

no additional power source is required, other than the repurposed portion of the robot that can move, to control the flow of the liquid coolant beyond the portion of the robot that can move.

12. The robotic welding system of claim 1 wherein:

a linear or rotational motion of the portion of the robot that can move controls the flow of the liquid coolant.

13. The robotic welding system of claim 1 wherein:

a weight of at least a portion of the welding apparatus provides at least a portion of a force to control the flow of the liquid coolant.

14. The robotic welding system of claim 1 further comprising:

a positive displacement pump selected from a group consisting of a bellows, a bladder, or a cylinder / piston pump.

15. The robotic welding system of claim 14 wherein:

the robot further comprises a robot arm; and the positive displacement pump is coupled to the robot arm of the welding apparatus.

16. The robotic welding system of claim 14 wherein:

the positive displacement pump is not disposed on the robot.

* * * * *